United States Patent
Dudley

(10) Patent No.: US 12,233,537 B1
(45) Date of Patent: Feb. 25, 2025

(54) TOWABLE ROLLING COLLECTOR

(71) Applicant: Silas Martin Dudley, Jacksonville, FL (US)

(72) Inventor: Silas Martin Dudley, Jacksonville, FL (US)

(*) Notice: Subject to any disclaimer, the term of this patent is extended or adjusted under 35 U.S.C. 154(b) by 326 days.

(21) Appl. No.: 17/870,305

(22) Filed: Jul. 21, 2022

Related U.S. Application Data

(60) Provisional application No. 63/228,755, filed on Aug. 3, 2021.

(51) Int. Cl.
| | | |
|---|---|---|
| *A01D 51/00* | (2006.01) | |
| *A01B 59/042* | (2006.01) | |
| *A01B 63/00* | (2006.01) | |
| *B25J 15/00* | (2006.01) | |

(52) U.S. Cl.
CPC ......... *B25J 15/0019* (2013.01); *A01B 59/042* (2013.01); *A01B 63/008* (2013.01); *A01D 51/002* (2013.01)

(58) Field of Classification Search
CPC ..... A63B 47/021; A01D 51/00; A01D 51/002
USPC .......................................... 414/439, 440, 441
See application file for complete search history.

(56) References Cited

U.S. PATENT DOCUMENTS

| | | | |
|---|---|---|---|
| 2,482,355 A | 9/1949 | McBride | |
| 2,539,596 A | 1/1951 | Smith | |
| 3,699,752 A | 10/1972 | Dandl | |
| 3,888,370 A * | 6/1975 | Gamblin | A63B 47/021 414/440 |
| 3,995,759 A * | 12/1976 | Hollrock | A01D 51/00 414/440 |
| 5,025,620 A | 6/1991 | Dudley | |
| 5,168,692 A | 12/1992 | Dudley | |
| 5,354,087 A * | 10/1994 | Head | B60D 1/46 280/490.1 |
| 5,882,169 A * | 3/1999 | Tucek | A63B 47/021 414/440 |
| 6,082,955 A * | 7/2000 | Tucek | A63B 47/021 414/440 |
| 7,134,828 B2 * | 11/2006 | Knez | A63B 47/024 414/440 |
| 7,455,493 B2 * | 11/2008 | Schoppe | A63B 47/024 414/440 |
| 7,793,487 B1 | 9/2010 | Schnell et al. | |
| 8,920,101 B2 * | 12/2014 | Leyco | A63B 47/021 414/439 |

(Continued)

*Primary Examiner* — Mark C Hageman
(74) *Attorney, Agent, or Firm* — Meunier Carlin & Curfman LLC

(57) ABSTRACT

Rolling collectors configured to locate and pick up small objects such as nuts, bullet casings, or other objects are described herein. In some implementations, a rolling collector includes a collector frame, a roller assembly, a remover mechanism, and a trailer tongue. In other implementations, a rolling collector includes a collector frame, a roller assembly having a skeleton structure, and a remover mechanism. In yet other implementations, a rolling collector includes a collector frame, a roller assembly, a remover mechanism, and a lifting mechanism. The rolling collectors described herein are configured to be towable behind a vehicle, which includes center pull, side drag, side-by-side, and multiple unit towing configurations.

21 Claims, 12 Drawing Sheets

(56) References Cited

U.S. PATENT DOCUMENTS

| | | | | |
|---|---|---|---|---|
| 8,926,253 B2* | 1/2015 | Uttech | ................ | B60P 1/44 |
| | | | | 414/921 |
| 9,414,543 B2* | 8/2016 | Dudley | ................ | A01D 51/002 |
| 9,775,278 B2* | 10/2017 | Zemenchik | ............ | A01B 63/32 |
| 9,826,680 B2 | 11/2017 | Dixon | | |
| 2006/0021318 A1 | 2/2006 | Briesemeister et al. | | |
| 2015/0190683 A1* | 7/2015 | Morgan | ................ | A63B 47/021 |
| | | | | 414/812 |

* cited by examiner

TOWABLE ROLLING COLLECTOR

CROSS-REFERENCE TO RELATED APPLICATIONS

This application claims the benefit of U.S. provisional patent application No. 63/228,755, filed on Aug. 3, 2021, and titled "TOWABLE ROLLING COLLECTOR," the disclosure of which is expressly incorporated herein by reference in its entirety.

BACKGROUND

Picking up small objects is a difficult task. For example, it requires an individual to bend over or squat down constantly and there is little guarantee that the unaided eye will locate all of the objects the individual wishes to pick up. In harvesting applications, a user desires to locate and pick up nuts (e.g., acorns, almonds, walnuts, chestnuts, hickory nuts, hazelnuts, macadamia nuts, pecans, sweet gum balls, and the like) around nut trees or in similar areas. The ability to locate and pick up more nuts in less time increases profitability. Alternatively, in firing range applications, a user desires to locate and pick up bullet casings to keep the range clean and free of debris. Devices such as those described in U.S. Pat. Nos. 5,025,620; 5,168,692; and 9,414,543 are capable of locating a picking up small objects such as nuts, bullet casings, and the like.

It would be desirable to have a durable, towable device configured to locate and pick up small objects. The devices described below address this need.

SUMMARY

An example rolling collector according to one implementation described herein includes a collector frame, a roller assembly, a remover mechanism, and a trailer tongue. The collector assembly includes a first side, a second side, and at least one cross member. The first side and the second side are spaced apart and coupled to opposite ends of the at least one cross member. The roller assembly includes a plurality of tine wheel units, where each of the tine wheel units includes a plurality of flexible tines. The roller assembly is rotationally coupled between the first side and the second side. The remover mechanism is arranged between the first side and the second side, and the remover mechanism includes a plurality of teeth, each of the teeth extending respectively between two adjacent tine wheel units. Additionally, the trailer tongue is coupled to the collector frame, wherein the trailer tongue comprises a hitch coupler.

In some implementations, the rolling collector optionally includes a side dragger extension frame coupled to the collector frame. The side dragger extension frame is arranged outboard with respect to one of the first side or the second side, and the trailer tongue is coupled to the side dragger extension frame.

Alternatively or additionally, the trailer tongue is coupled to the collector frame or the side dragger extension frame via a tongue height adjustment plate.

Alternatively or additionally, the rolling collector optionally includes a pair of bearing assemblies.

Alternatively or additionally, the collector frame optionally further includes an upper basket seat portion arranged above the rolling collector. The upper basket seat portion is configured to accommodate one or more collection baskets. Optionally, the upper basket seat portion includes one or more tie down anchors.

Alternatively or additionally, the collector frame optionally further includes a lower basket seat portion arranged forwardly with respect to the roller assembly. The lower basket seat portion is configured to accommodate one or more collection baskets.

In some implementations, the rolling collector optionally further includes a baffle mechanism coupled between the first side and the second side. The baffle mechanism is configured to deflect objects into a collection basket.

Alternatively or additionally, the collector frame optionally further includes a rear bumper member coupled between the first side and the second side. The rear bumper member optionally includes a rear hitch coupler.

In some implementations, the rolling collector optionally further includes a lifting mechanism including a plurality of wheels and a lift support frame. The lifting mechanism is rotationally coupled to the collector frame such that the lift support frame is moveable between an engaged position and a non-engaged position. In the engaged position, the wheels are configured to raise the roller assembly above a collection surface. Additionally, the lift support frame is movable around a respective rotational mounting point located at each of the first side and second side. Alternatively or additionally, the lifting mechanism is sized and shaped to hold the lift support frame in the engaged position or the non-engaged position. Optionally, the lifting mechanism further includes a lift handle coupled to the lift support frame. The lift handle is configured to move the lift support frame between the engaged position and the non-engaged position.

Alternatively or additionally, the remover mechanism optionally further includes a remover cross member coupled to the collector frame. The teeth are pivotably connected to the remover cross member.

In some implementations, the rolling collector optionally further includes a push handle coupled to the collector frame, the push handle extending upwards from the collector frame.

An example rolling collector according to another implementation described herein includes a collector frame, a roller assembly, and a remover mechanism. The collector assembly includes a first side, a second side, and at least one cross member. The first side and the second side are spaced apart and coupled to opposite ends of the at least one cross member. The roller assembly includes a skeleton structure and a plurality of tine wheel units. The skeleton structure is rotationally coupled between the first side and the second side, and the skeleton structure includes a pair of hubs and a plurality of struts, where a first hub and a second hub of the pair of hubs are coupled to respective opposite ends of each of the struts. Additionally, each of the tine wheel units includes a plurality of flexible tines, and the tine wheel units are arranged around and supported by the struts. The remover mechanism is arranged between the first side and the second side, and the remover mechanism includes a plurality of teeth, each of the teeth extending respectively between two adjacent tine wheel units.

In some implementations, each of the first hub and the second hub of the pair of hubs includes a respective stub shaft. Additionally, the respective stub shafts are supported by the first side and the second side. In other implementations, the rolling collector optionally includes a pair of bearing assemblies, where a first bearing assembly and a second bearing assembly of the pair of bearing assemblies are coupled to the first side and the second side, respectively, and the respective stub shafts are installed within and supported by the pair of bearing assemblies.

In another implementation, each of the first side and the second side includes a respective stub shaft. Additionally, the rolling collector optionally includes a pair of bearing assemblies, where a first bearing assembly and a second bearing assembly of the pair of bearing assemblies are coupled to the first hub and the second hub of the pair of hubs, respectively, and the respective stub shafts are installed within and supported by the pair of bearing assemblies.

Alternatively or additionally, the skeleton structure optionally includes four struts.

In some implementations, the rolling collector optionally further includes a trailer tongue coupled to the collector frame. The trailer tongue includes a hitch coupler. Additionally, the trailer tongue is coupled between the first side and the second side. Optionally, the trailer tongue is coupled approximately midline with respect to the collector frame. Alternatively or additionally, the trailer tongue is optionally coupled to the collector frame via a tongue height adjustment plate.

In some implementations, the rolling collector optionally further includes a side dragger extension frame coupled to the collector frame, where the side dragger extension frame is arranged outboard with respect to one of the first side or the second side, and a trailer tongue coupled to the side dragger extension frame. The trailer tongue includes a hitch coupler. Optionally, the trailer tongue is coupled to the collector frame via a tongue height adjustment plate.

Alternatively or additionally, the collector frame optionally further includes an upper basket seat portion arranged above the rolling collector. The upper basket seat portion is configured to accommodate one or more collection baskets. Optionally, the upper basket seat portion includes one or more tie down anchors.

Alternatively or additionally, the collector frame optionally further includes a lower basket seat portion arranged forwardly with respect to the roller assembly. The lower basket seat portion is configured to accommodate one or more collection baskets.

In some implementations, the rolling collector optionally further includes a baffle mechanism coupled between the first side and the second side. The baffle mechanism is configured to deflect objects into a collection basket.

Alternatively or additionally, the collector frame optionally further includes a rear bumper member coupled between the first side and the second side. The rear bumper member optionally includes a rear hitch coupler.

In some implementations, the rolling collector optionally further includes a lifting mechanism including a plurality of wheels and a lift support frame. The lifting mechanism is rotationally coupled to the collector frame such that the lift support frame is moveable between an engaged position and a non-engaged position. In the engaged position, the wheels are configured to raise the roller assembly above a collection surface. Additionally, the lift support frame is movable around a respective rotational mounting point located at each of the first side and second side. Alternatively or additionally, the lifting mechanism is sized and shaped to hold the lift support frame in the engaged position or the non-engaged position. Optionally, the lifting mechanism further includes a lift handle coupled to the lift support frame. The lift handle is configured to move the lift support frame between the engaged position and the non-engaged position.

Alternatively or additionally, the remover mechanism optionally further includes a remover cross member coupled to the collector frame. The teeth are pivotably connected to the remover cross member.

In some implementations, the rolling collector optionally further includes a push handle coupled to the collector frame, the push handle extending upwards from the collector frame.

An example rolling collector according to yet another implementation described herein includes a collector frame, a roller assembly, a remover mechanism, and a lifting mechanism. The collector assembly includes a first side, a second side, and at least one cross member. The first side and the second side are spaced apart and coupled to opposite ends of the at least one cross member. The roller assembly includes a plurality of tine wheel units, where each of the tine wheel units includes a plurality of flexible tines. The roller assembly is rotationally coupled between the first side and the second side. The remover mechanism is arranged between the first side and the second side, and the remover mechanism includes a plurality of teeth, each of the teeth extending respectively between two adjacent tine wheel units. The lifting mechanism including a plurality of wheels and a lift support frame. The lifting mechanism is rotationally coupled to the collector frame such that the lift support frame is moveable between an engaged position and a non-engaged position. In the engaged position, the wheels are configured to raise the roller assembly above a collection surface.

Additionally, the lift support frame is movable around a respective rotational mounting point located at each of the first side and second side. Alternatively or additionally, the lifting mechanism is sized and shaped to hold the lift support frame in the engaged position or the non-engaged position. Optionally, the lifting mechanism further includes a lift handle coupled to the lift support frame. The lift handle is configured to move the lift support frame between the engaged position and the non-engaged position.

Alternatively or additionally, the rolling collector optionally includes a pair of bearing assemblies.

In some implementations, the rolling collector optionally further includes a trailer tongue coupled to the collector frame. The trailer tongue includes a hitch coupler. Additionally, the trailer tongue is coupled between the first side and the second side. Optionally, the trailer tongue is coupled approximately midline with respect to the collector frame. Alternatively or additionally, the trailer tongue is optionally coupled to the collector frame via a tongue height adjustment plate.

In some implementations, the rolling collector optionally further includes a side dragger extension frame coupled to the collector frame, where the side dragger extension frame is arranged outboard with respect to one of the first side or the second side, and a trailer tongue coupled to the side dragger extension frame. The trailer tongue includes a hitch coupler. Optionally, the trailer tongue is coupled to the collector frame via a tongue height adjustment plate.

Alternatively or additionally, the collector frame optionally further includes an upper basket seat portion arranged above the rolling collector. The upper basket seat portion is configured to accommodate one or more collection baskets. Optionally, the upper basket seat portion includes one or more tie down anchors.

Alternatively or additionally, the collector frame optionally further includes a lower basket seat portion arranged forwardly with respect to the roller assembly. The lower basket seat portion is configured to accommodate one or more collection baskets.

In some implementations, the rolling collector optionally further includes a baffle mechanism coupled between the first side and the second side. The baffle mechanism is configured to deflect objects into a collection basket.

Alternatively or additionally, the collector frame optionally further includes a rear bumper member coupled between the first side and the second side. The rear bumper member optionally includes a rear hitch coupler.

Alternatively or additionally, the remover mechanism optionally further includes a remover cross member coupled to the collector frame. The teeth are pivotably connected to the remover cross member.

In some implementations, the rolling collector optionally further includes a push handle coupled to the collector frame, the push handle extending upwards from the collector frame.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

FIG. 11A illustrates rolling collectors in a side pull configuration. FIG. 11B illustrates rolling collectors in a center pull configuration.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. As used herein, the terms "about" or "approximately" when referring to a measurable value such as an amount, a percentage, and the like, is meant to encompass variations of ±20%, ±10%, ±5%, or ±1% from the measurable value. While implementations will be described for rolling collectors configured to pick up small items such as nuts (e.g., acorns, almonds, walnuts, chestnuts, hickory nuts, hazelnuts, macadamia nuts, pecans, sweet gum balls, and the like), it will become evident to those skilled in the art that the implementations are not limited thereto, but are applicable for rolling collectors configured to pick up other small items including, but not limited to, bullet casings, screws, nuts and/or bolts, balls, and pine cones.

Figure 1:
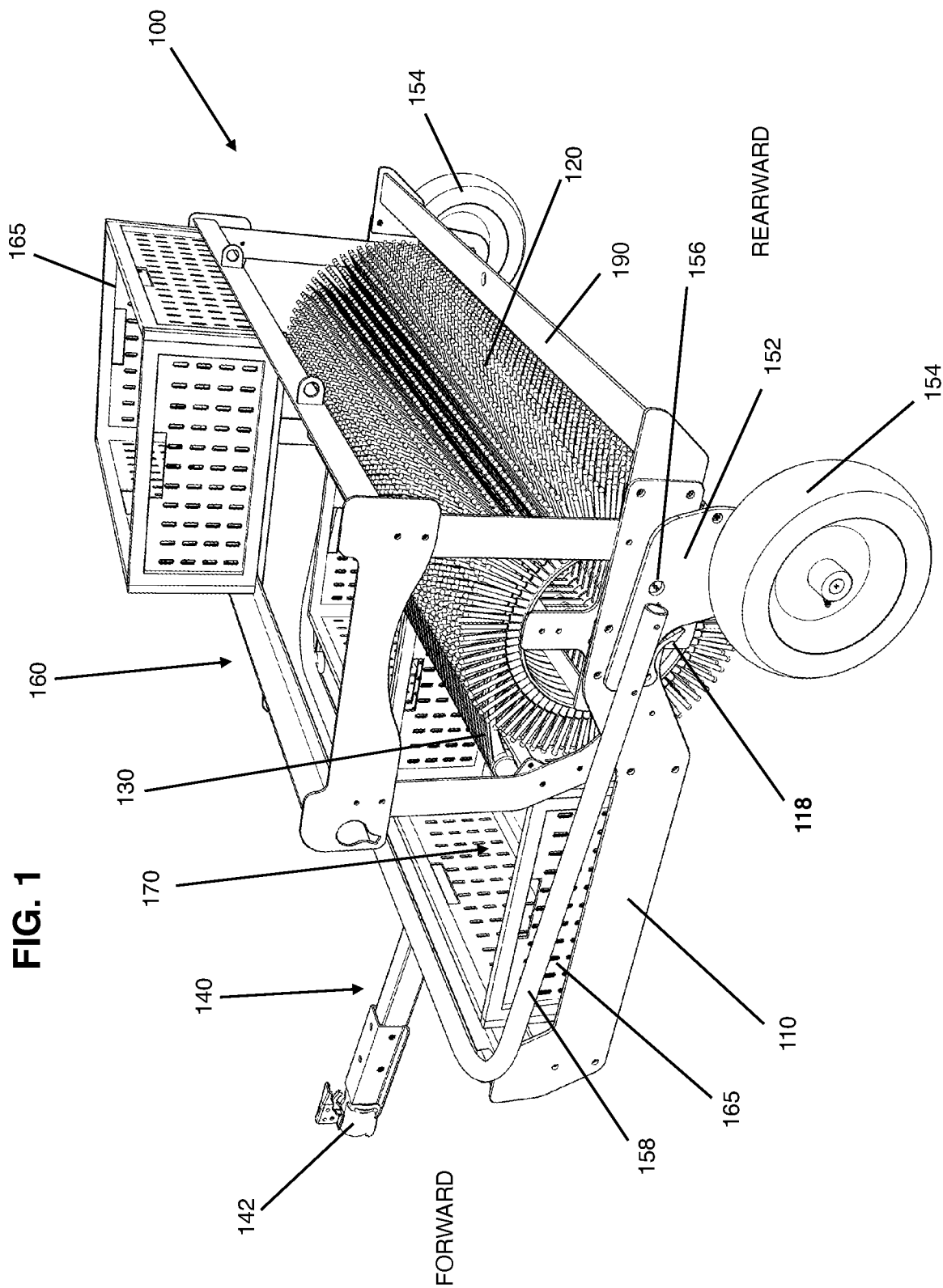
FIG. 1 is a perspective view illustrating a towable rolling collector configured for center pull operation according to implementations described herein.
Figure 2:
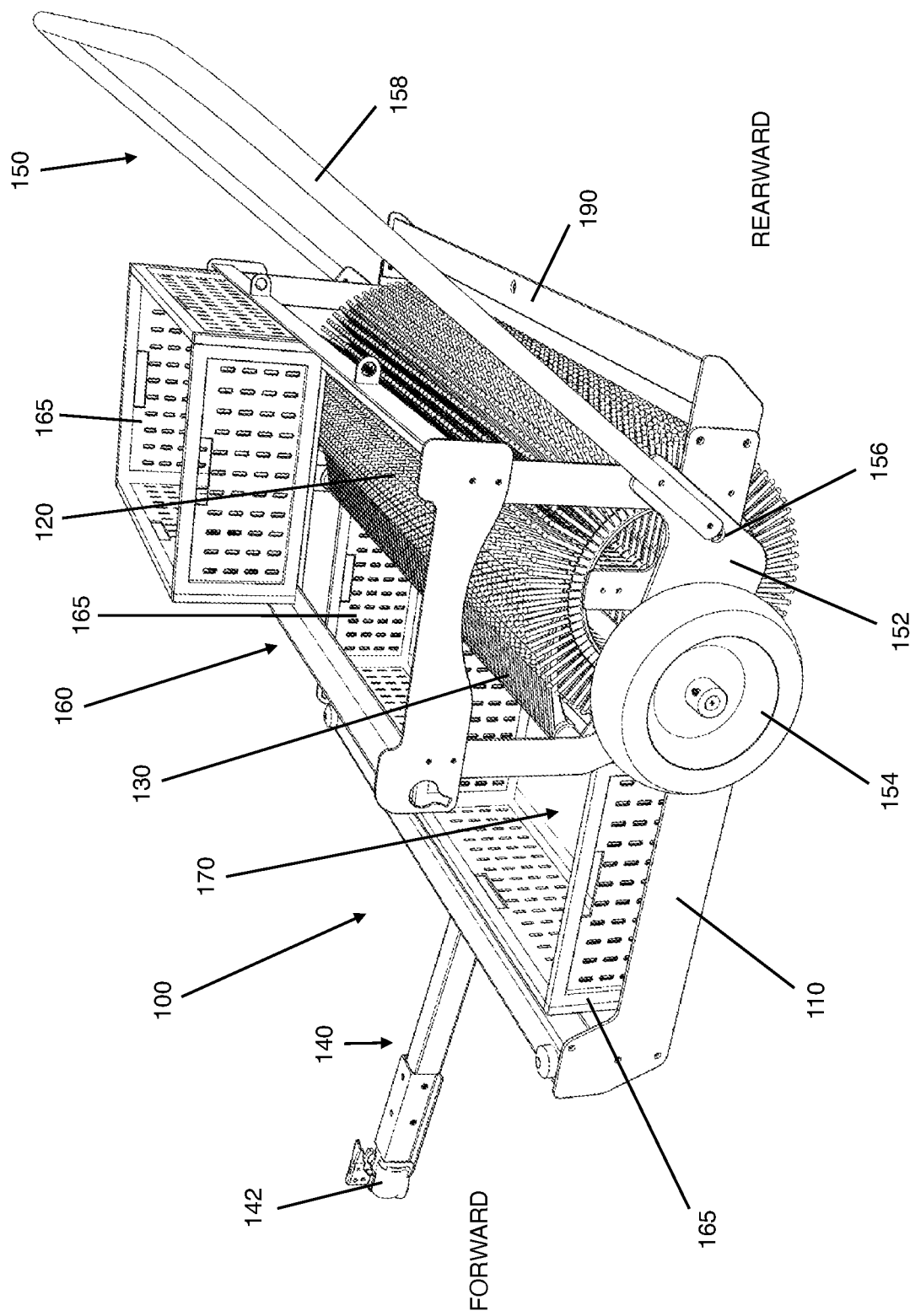
FIG. 2 is another perspective view illustrating the towable rolling collector shown in FIG. 1.
Figure 3:
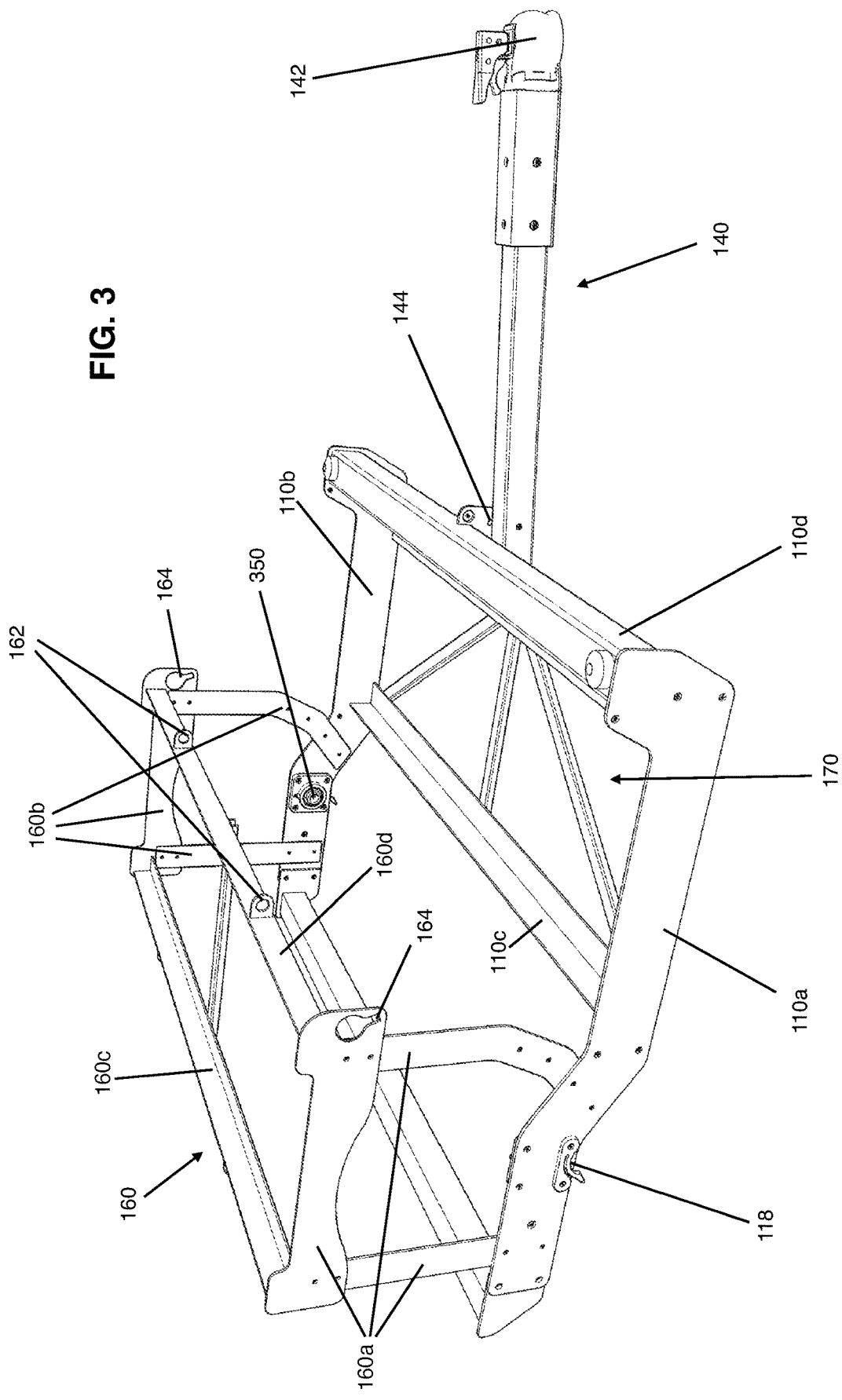
FIG. 3 is a perspective view illustrating a collector frame of the towable rolling collector of FIG. 1.

Referring now to FIGS. 1-7, rolling collectors according to implementations described herein are described. For example, a rolling collector 100 according to an aspect of this disclosure is described with reference to FIGS. 1-4. The rolling collector 100 includes a collector frame 110, a roller assembly 120, a remover mechanism 130, and a trailer tongue 140. Referring now to FIG. 3, the collector frame 110 includes a first side 110a and a second side 110b spaced laterally apart and interconnected by at least one cross member (described below). The first and second sides 110a and 110b are formed from a rigid material. For example, in some implementations, the first and second sides 110a and 110b are metal. Optionally, the first and second sides 110a and 110b are flat metal such as sheet metal or flat plate metal. It should be understood that metal is provided only as an example material. This disclosure contemplates that the first and second sides 110a and 110b can be formed from other suitable rigid material including, but not limited to, wood, plastic, fiberglass, or composite material. Those skilled in the art would appreciate that the first and second sides 110a and 110b (and/or other components of the rolling collector 100) may be formed using a laser cutting machine such as a computer numerical control (CNC) machine. Laser cutting machines and processes are known in the art and therefore not described in further detail herein. Additionally, each of the first and second sides 110a and 110b includes a plurality of components (see FIG. 3) or alternatively can be a single component (not shown). When a side includes a plurality of components, the components can be connected by one or more fasteners such as welded joints, screws, nuts and bolts, rivets, or other fastening mechanism. Optionally, in some implementations, the first side 110*a* and/or the second side 110*b* includes one or more holes, notches, grooves, etc. to facilitate assembly of the rolling collector 100.

As discussed above, the first and second sides 110*a* and 110*b* are interconnected by at least one cross member. The cross member (or cross members) can be attached perpendicularly between the first and second sides 110*a* and 110*b*. As shown in FIG. 3, the first and second sides 110*a* and 110*b* are interconnected by at least two cross members 110*c* and 110*d*. The first side 110*a* and the second side 110*b* are attached at opposite ends of the cross members. It should be understood that the number and/or arrangement of cross members 110*c* and 110*d* in FIG. 3 are provided only as an example. This disclosure contemplates providing different numbers and/or arrangements of cross members. Similarly to the first and second sides 110*a* and 110*b*, the cross members 110*c* and 110*d* are formed from a rigid material. For example, in some implementations, the cross members 110*c* and 110*d* are metal. Optionally, the cross members 110*c* and 110*d* are metal bars or tubing such as flat bar, round bar, angle bar, or metal tubing (e.g., round, square, rectangular). For example, in FIG. 3, cross member 110*c* is an angle bar and cross member 110*d* is metal tubing. It should be understood that metal is provided only as an example material. This disclosure contemplates that cross members 110*c* and 110*d* can be formed from other suitable rigid material including, but not limited to, wood, plastic, fiberglass, or composite material. Additionally, the first and second sides 110*a* and 110*b* can be connected to cross members 110*c* and 110*d* by one or more fasteners such as welded joints, screws, nuts and bolts, rivets, or other fastening mechanism. Optionally, in some implementations, cross members 110*c* and/or 110*d* includes one or more holes, notches, grooves, etc. to facilitate assembly of the rolling collector 100.

Figure 4:
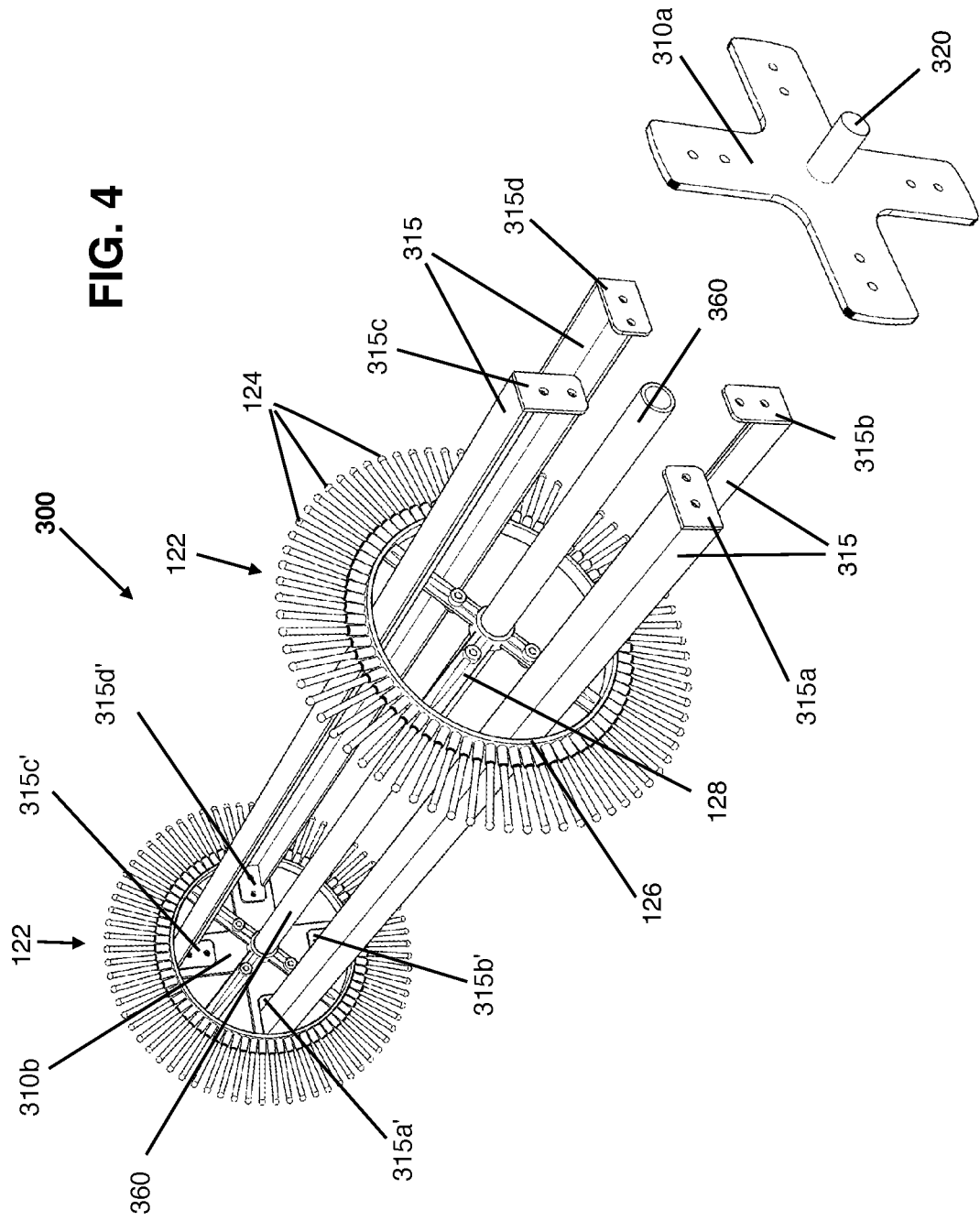
FIG. 4 is a perspective view illustrating a skeletal structure of a roller assembly according to implementations described herein.

The roller assembly 120 is rotationally coupled between the first side 110*a* and the second side 110*b*. Referring now to FIG. 4, the roller assembly 120 includes a plurality of tine wheel units 122, where each of the tine wheel units 122 includes a plurality of flexible tines 124. As shown in FIGS. 1 and 2, the tine wheel units 122 are arranged in a side-by-side manner between the first and second sides of the rolling collector 100. Referring again to FIG. 4, in some implementations, a tine wheel unit 122 includes a rim 126 and a plurality of spokes 128. Each of the spokes 128 extends radially from a center of the tine wheel unit 122 to the rim 126. It should be understood that the number and/or arrangement of the spokes 128 shown in FIG. 4 are provided only as an example. This disclosure contemplates providing tine wheel units 122 having different numbers and/or arrangement of spokes 128. Additionally, each of the flexible tines 124 extends radially outward from the rim 126. It should be understood that the number and/or arrangement of the flexible tines 124 shown in FIG. 4 are provided only as an example. This disclosure contemplates providing tine wheel units 122 having different numbers and/or arrangement of flexible tines 124.

The flexible tines 124 are spaced laterally from one another and are configured to pick up small items as rolling assembly 120 rolls over the items by flexibly entraining a small item (e.g., nut, bullet casing, etc.) between adjacent flexible tines 124. In at least the lateral direction, the flexible tines 124 are spaced at least a distance approximately equal to the narrowest dimension of the small item the rolling collector 100 is designed and configured to pick up. For example, for nuts the spacing of the flexible tines 124 is approximately equal to the narrowest width of the nut casing, whether the nut casing is oval (pecans), round (walnuts), or another cross section. Alternatively, for bullet casings, the flexible tines 124 are laterally spaced from one another a distance approximately equal to the diameter of a bullet casing. It should be understood that spacing of flexible tines 124 need not be precisely adapted for the type of small item being gathered because flexible tines 124 are flexible. It is only necessary that the play between adjacent tine wheel units 122, the flexibility of flexible tines 124, and any other looseness in the structure of the roller assembly 120 be sufficient to allow small items to be jammed between adjacent flexible tines 124 tightly enough to be restrained there until removed from the roller assembly 120 by the remover mechanism 130.

The remover mechanism 130 is arranged between the first and second sides of the rolling collector 100. The remover mechanism 130 is connected to the collector frame 110, for example, by one or more fasteners such as welded joints, screws, nuts and bolts, rivets, or other fastening mechanism. The remover mechanism 130 includes a plurality of teeth, each of the teeth extending respectively between two adjacent tine wheel units 122. Optionally, the remover mechanism 130 includes a remover cross member 132 attached to the collector frame 110 (see FIG. 5). The teeth are pivotably connected to the remover cross member 132. In other words, the remover mechanism 130 is a large comb-like structure with a plurality of teeth connected to the remover cross member 132. The remover mechanism 130 is designed and configured such that the teeth protrude between adjacent tine wheel units 122. When a small item (e.g., nut, bullet casing, etc.) jammed between adjacent flexible tines 124 encounters the remover mechanism 130, the small item is pried from the grip of the flexible tines 124 as the rolling assembly 120 rotates. The small item then slides across remover mechanism 130 and into a collection basket 165. The remover cross member 132 is formed from a rigid material. For example, in some implementations, the remover cross member 132 is metal such a round bar or metal tubing. It should be understood that metal is provided only as an example material. This disclosure contemplates that the remover cross member 132 can be formed from other suitable rigid material including, but not limited to, wood, plastic, fiberglass, or composite material. The teeth are also formed of a rigid material. For example, in some implementations, the teeth are formed from plastic or composite material. It should be understood that plastic and composite material are provided only as example materials. This disclosure contemplates that the teeth can be formed from other suitable rigid material including, but not limited to, metal, wood, or fiberglass.

Figure 11:
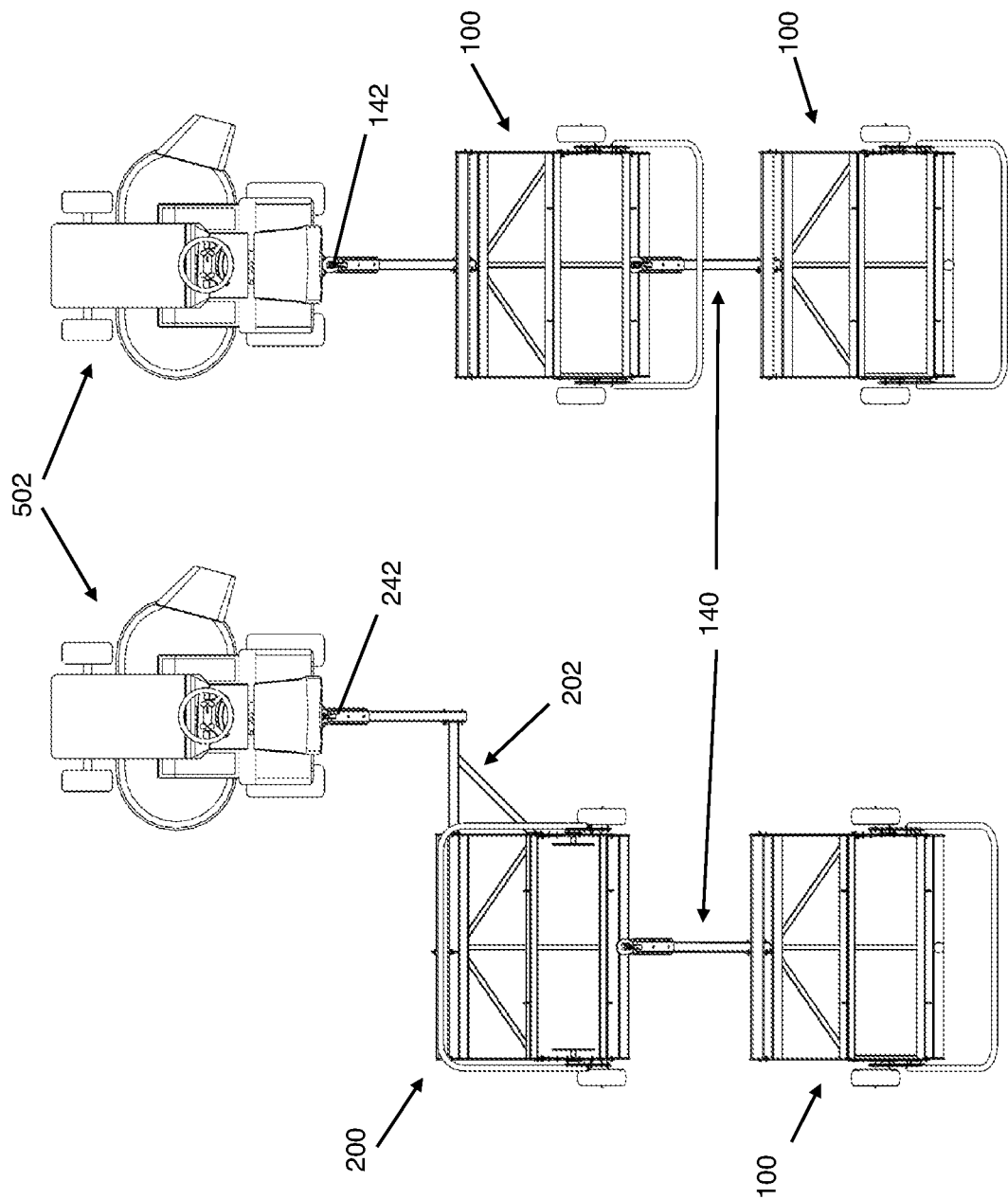
FIGS. 11A-11B are top views illustrating a lawn mower towing a plurality of towable rolling collectors according to implementations described herein.

In some implementations, the rolling collector is configured for center pull operations (see e.g., FIG. 11B). In these implementations, the rolling collector is pulled along directly behind a tow vehicle. This disclosure contemplates that a tow vehicle can be a tractor, truck, golf cart, utility vehicle, or other motorized vehicle. Referring to now to FIGS. 1-3 and 6, the rolling collector 100 includes a trailer tongue 140. The trailer tongue 140 extends forwardly from the rolling collector 100. The trailer tongue 140 is formed from a rigid material. For example, in some implementations, the trailer tongue 140 is metal. Optionally, the trailer tongue 140 is a metal bar or tubing such as flat bar, round bar, angle bar, or metal tubing (e.g., round, square, rectangular). For example, the trailer tongue 140 can optionally be rectangular or square metal tubing. It should be understood that metal is provided only as an example material. This disclosure contemplates that the trailer tongue 140 can be formed from other suitable rigid material including, but not limited to, wood, plastic, fiberglass, or composite material. The trailer tongue 140 is attached to the collector frame 110 between the first side 110a and the second side 110b of the rolling collector 100. Optionally, the trailer tongue 140 is coupled approximately midline (or centerline) with respect to the collector frame 110, e.g., approximately ½ the distance between the first side 110a and the second side 110b of the rolling collector 100. The trailer tongue 140 can be coupled to the collector frame 110 (e.g., to a cross member) by one or more fasteners such as welded joints, screws, nuts and bolts, rivets, or other fastening mechanism.

Additionally, as shown in FIGS. 1-3 and 6, the trailer tongue 140 has a hitch coupler 142, e.g., a coupler configured to receive a ball mount. This disclosure contemplates that the hitch coupler 142 can be configured to receive another type of mount including, but not limited to, a pintle hook or other mount attached to a tow vehicle. Optionally, the trailer tongue 140 is coupled to the collector frame 110 via a tongue height adjustment plate 144 (see FIG. 3). For example, the tongue height adjustment plate 144, which is attached to the collector frame 110, can include a plurality of holes, each at different heights. The trailer tongue 140 can be coupled to the collector frame 110 by inserting a screw, bolt, pin, etc. into one or more holes of the tongue height adjustment plate 144 at an appropriate height to maintain a level collection basket height for a given tow vehicle. Maintaining level collection baskets 165 ensures that the collection baskets 165 hold the most product.

Figure 5:
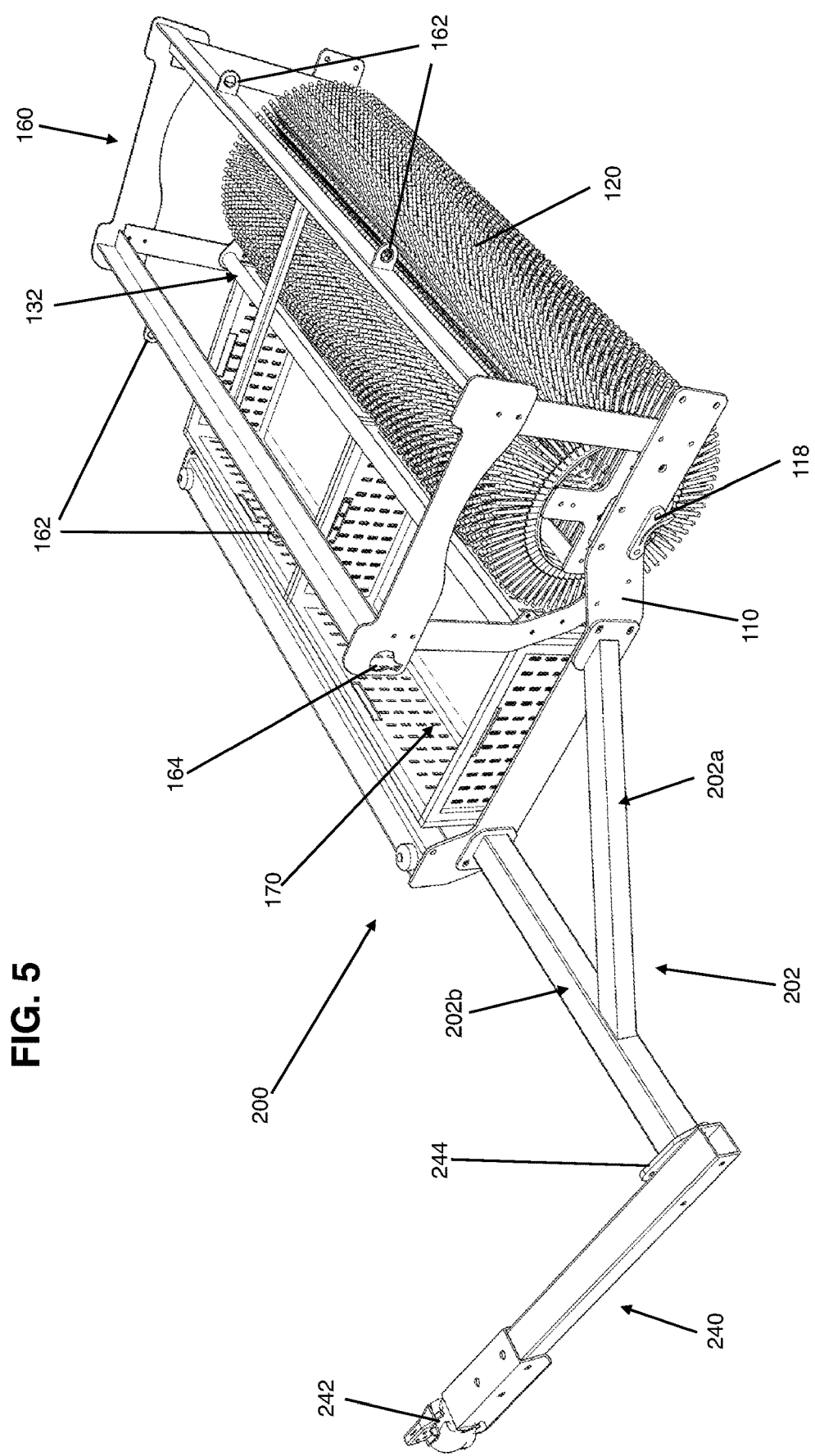
FIG. 5 is another perspective view illustrating a collector frame configured for side drag operations according to implementations described herein.
Figure 10:
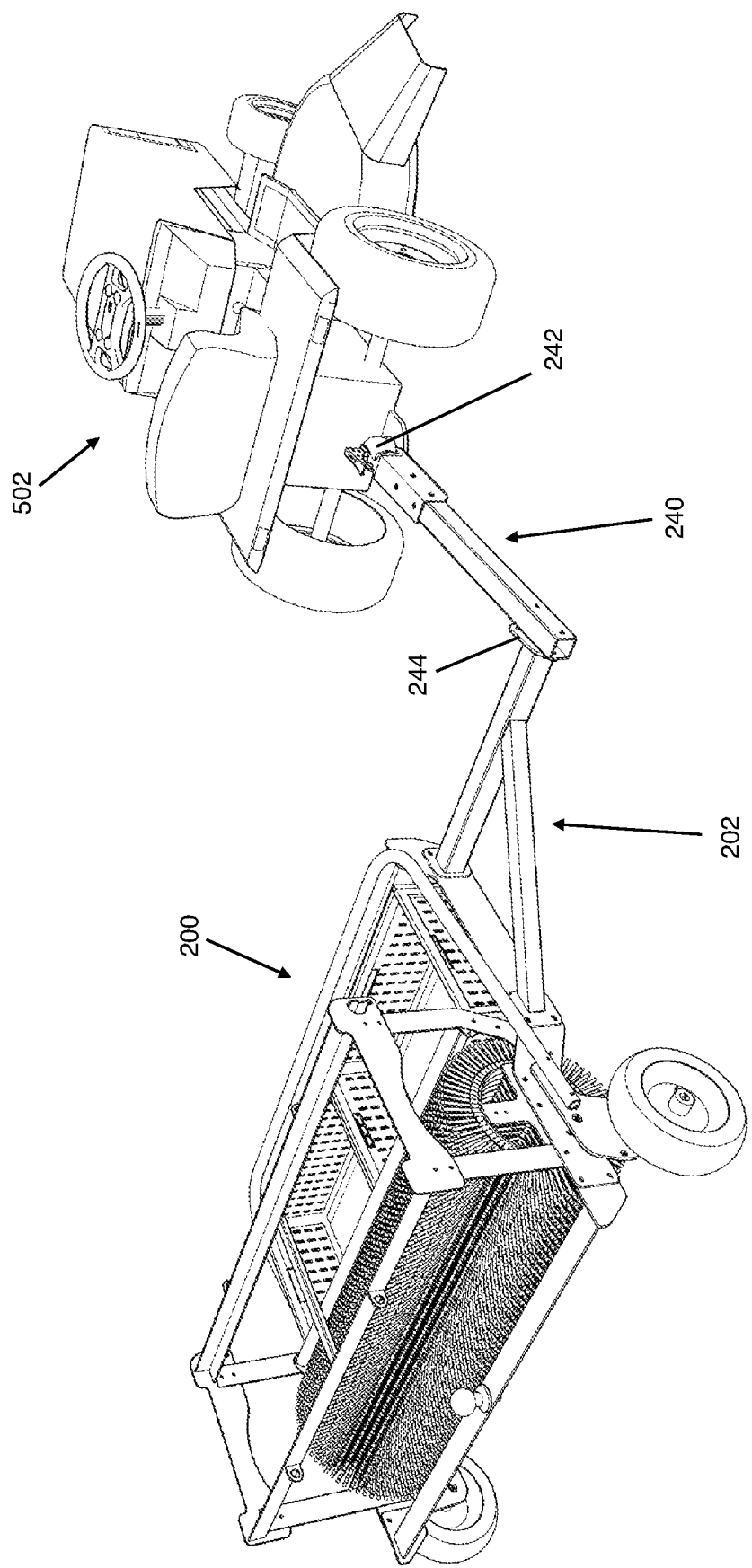
FIG. 10 is a perspective view illustrating a lawn mower towing a towable rolling collector according to implementations described herein.

In other implementations, the rolling collector is configured for side pull operations (see e.g., FIG. 10). In these implementations, the rolling collector is pulled along behind and to the rear of a tow vehicle but offset to one side of the tow vehicle. Unlike center pull operations, the side pull configuration guarantees that the rolling collector will roll over an area and collect small items (e.g., nuts, bullet casings, etc.) before the tow vehicle rolls over the same area. It should be understood that the tow vehicle's wheels can damage (e.g., crush) small items, which can result in loss of product. As noted above, this disclosure contemplates that a tow vehicle can be a tractor, truck, golf cart, utility vehicle, or other motorized vehicle. Referring now to FIG. 5, the rolling collector 200 includes a side dragger extension frame 202. In FIG. 5, the side dragger extension frame 202 includes two components 202a and 202b arranged in a "Y" configuration. Component 202b extends perpendicularly outward with respect to one side of the rolling collector 200 (e.g., left side in FIG. 5), while component 202a extends outwardly at an angle between the side of the rolling collector 200 and component 202b. It should be understood that the side dragger extension frame 202 shown in FIG. 5 is provided only as an example. This disclosure contemplates that the side dragger extension frame 202 can have other configurations than shown in FIG. 5, including a different number and/or arrangements of components. Additionally, it should be understood that the side dragger extension frame 202 can be mounted on either side (left or right) of the rolling collector 200.

The side dragger extension frame 202 is formed from a rigid material. For example, in some implementations, the side dragger extension frame 202 is metal. Optionally, the side dragger extension frame 202 is a metal bar or tubing such as flat bar, round bar, angle bar, or metal tubing (e.g., round, square, rectangular). For example, the side dragger extension frame 202 can optionally be rectangular or square metal tubing. It should be understood that metal is provided only as an example material. This disclosure contemplates that the side dragger extension frame 202 can be formed from other suitable rigid material including, but not limited to, wood, plastic, fiberglass, or composite material. The side dragger extension frame 202 is coupled to a side of the rolling collector 200. The side dragger extension frame 202 can be coupled to the collector frame 110 by one or more fasteners such as welded joints, screws, nuts and bolts, rivets, or other fastening mechanism.

The rolling collector 200 also includes a trailer tongue 240 coupled to the side dragger extension frame 202. The trailer tongue 240 extends forwardly from the rolling collector 200. The trailer tongue 240 is formed from a rigid material. For example, in some implementations, the trailer tongue 240 is metal. Optionally, the trailer tongue 240 is a metal bar or tubing such as flat bar, round bar, angle bar, or metal tubing (e.g., round, square, rectangular). For example, the trailer tongue 240 can optionally be rectangular or square metal tubing. It should be understood that metal is provided only as an example material. This disclosure contemplates that the trailer tongue 240 can be formed from other suitable rigid material including, but not limited to, wood, plastic, fiberglass, or composite material. The trailer tongue 240 can be coupled to the side dragger extension frame 202 by one or more fasteners such as welded joints, screws, nuts and bolts, rivets, or other fastening mechanism.

Additionally, as shown in FIG. 5, the trailer tongue 240 has a hitch coupler 242, e.g., a coupler configured to receive a ball mount. This disclosure contemplates that the hitch coupler 242 can be configured to receive another type of mount including, but not limited to, a pintle hook or other mount attached to a tow vehicle. Optionally, the trailer tongue 240 is coupled to the side dragger extension frame 202 via a tongue height adjustment plate 244. For example, the tongue height adjustment plate 244, which is attached to the side dragger extension frame 202, can include a plurality of holes, each at different heights. The trailer tongue 240 can be coupled to the side dragger extension frame 202 by inserting a screw, bolt, pin, etc. into one or more holes of the tongue height adjustment plate 244 at an appropriate height to maintain a level collection basket height for a given tow vehicle.

Referring now to FIG. 4, the skeleton structure 300 of the roller assembly 120 according to aspects of the disclosure is described. The skeleton structure 300 includes a pair of hubs 310 (referred to individually as hub 310a and hub 310b) and a plurality of struts 315. The struts 315 are configured to support the plurality of the tine wheel units 122, which are arranged in a side-by-side manner between the pair of hubs 310. The tine wheel units 122 are arranged around and supported by the struts 315. The skeleton structure 300 provides more rigidity (and is less flexible) than an axle used in conventional rolling collectors. The skeleton structure 300 facilitates the ability to arrange the tine wheel units 122 in a side-by-side manner between the pair of hubs 310 for greater distances without deformation of the support structure. For example, the distance between the pair of hubs 310 is optionally greater than 18 inches, and optionally up to between about 36-42 inches in some implementations. Those skilled in the art would appreciate that an axle used in conventional rolling collectors may experience deformation (e.g. sagging) and would be less durable than the skeleton structure 300. In FIG. 4, the skeleton structure 300 includes four struts 315, each arranged to contact a spoke 128 of a tine wheel unit 122. It should be understood that the number and/or arrangement of the struts 315 shown in FIG. 4 is provided only as an example. This disclosure contemplates that the skeleton structure 300 can include a different number and/or arrangement of struts 315.

The pair of hubs 310 and struts 315 are formed from a rigid material. For example, in some implementations, the pair of hubs 310 and struts 315 are metal. Optionally, the pair of hubs 310 are flat metal such as sheet metal or flat plate metal. Optionally, the struts 315 are metal bars or tubing such as flat bar, round bar, angle bar, or metal tubing (e.g., round, square, rectangular). For example, in FIG. 4, the pair of hubs 310 are flat metal, and the struts 315 are angle bar. It should be understood that metal is provided only as an example material. This disclosure contemplates that the pair of hubs 310 and struts 315 can be formed from other suitable rigid material including, but not limited to, wood, plastic, fiberglass, or composite material.

As shown in FIG. 4, a first hub 310a and a second hub 310b of the pair of hubs 310 are attached to respective opposite ends of each of the struts 315. In particular, hub 310a is perpendicularly mounted to strut ends 315a-315d, and hub 310b is perpendicularly mounted to strut ends 315a'-315d'. Additionally, the hubs 310a and 310b can be coupled to the struts 315 by one or more fasteners such as welded joints, screws, nuts and bolts, rivets, or other fastening mechanism. Optionally, in some implementations, the hubs 310 and struts 315 include one or more holes, notches, grooves, etc. to facilitate assembly of the skeleton structure 300.

Optionally, in some implementations, the skeleton structure 300 further includes a center shaft 360 in addition to the struts 315. As shown in FIG. 4, the center shaft 360 extends between the first hub 310a and the second hub 310b. The center shaft 360 extends approximately in parallel with each of the struts 315. As discussed above, each tine wheel unit 122 includes a plurality of spokes 128 that extend radially from a center of the tine wheel unit 122 to the rim 126. Optionally, the center of each of the tine wheel units 122 is shaped (e.g., circular) to accommodate the center shaft 360. The center shaft 360 is formed of a rigid material such as plastic or metal. As discussed above, the struts 315 provide more rigid support for the tine wheel units 122 than using an axle (e.g., center shaft 360) alone.

Referring now to FIGS. 1-4, the skeleton structure 300 is rotationally coupled between the first side 110a and the second side 110b of the rolling collector 100. For example, in some implementations, each of the first hub 310a and the second hub 310b includes a respective stub shaft 320 (see FIG. 4), and the respective stub shafts 320 are supported by the first side 110a and the second side 110b of the rolling collector 100. In this implementation, the respective stub shafts 320 can be supported in a respective hole, notch, groove, etc. formed in the first side 110a and the second side 110b of the rolling collector 100. In other implementations, the rolling collector 100 optionally includes a pair of bearing assemblies 350, where a first bearing assembly and a second bearing assembly of the pair of bearing assemblies 350 are coupled to the first side 110a and the second side 110b, respectively, and the respective stub shafts are installed within and supported by the pair of bearing assemblies 350. Bearing assemblies are mechanical elements that constrain motion and/or reduce friction between moving parts. Bearing assemblies are well known in the art and therefore not described in further detail herein. In yet another implementation, each of the first side 110a and the second side 110b of the rolling collector 100 optionally includes a respective stub shaft, and a first bearing assembly and a second bearing assembly of the pair of bearing assemblies 350 are coupled to the first hub 310a and the second hub 310b of the skeleton structure 300, respectively. The respective stub shafts are installed within and supported by the pair of bearing assemblies 350.

Optionally, in some implementations, the rolling collector 100 further includes a lifting mechanism 150. The lifting mechanism 150 is configured to raise the roller assembly 120 above a collection surface (e.g., the ground) when the user is not collecting small items (e.g., nuts, bullet casings, etc.). This is useful, for example, when the user is transporting the rolling collector 100 to/from storage, or when the user is transporting the rolling collector 100 between collection areas. It should be understood that raising the roller assembly 120 above the collection surface reduces wear and tear on the roller assembly 120 when not in use, which prolongs the useful lifetime of the rolling collector 100. Those skilled in the art would appreciate that towable rolling collectors are more susceptible to wear and tear than those operated manually by a user.

Referring now to FIGS. 1, 2, 6, and 7, the lifting mechanism 150 includes a plurality of wheels 154 and a lift support frame 152. Optionally, the lifting mechanism 150 further includes a lift handle 158 coupled to the lift support frame 152. As described below, the lift handle 158 is configured to move the lift support frame 152 between an engaged position and a non-engaged position. The lift support frame 152 and lift handle 158 are formed from a rigid material. For example, in some implementations, the lift support frame 152 and lift handle 158 are metal. Optionally, the lift support frame 152 and lift handle 158 are flat metal such as sheet metal or flat plate metal or metal bars or tubing such as flat bar, round bar, angle bar, or metal tubing (e.g., round, square, rectangular). It should be understood that metal is provided only as an example material. This disclosure contemplates that lift support frame 152 and lift handle 158 can be formed from other suitable rigid material including, but not limited to, wood, plastic, fiberglass, or composite material. Additionally, the lift support frame 152 and lift handle 158 can be coupled to each other and/or to the collector frame 110 by one or more fasteners such as welded joints, screws, nuts and bolts, rivets, or other fastening mechanism.

The lifting mechanism 150 is rotationally coupled to the collector frame 110, for example, such that the lift support frame 152 is movable around a respective rotational mounting point 156 located at each of the first and second sides of the rolling collector 100. The wheels 154 are located adjacent to and outboard of the roller assembly 120, e.g., one wheel 154 on each side of the rolling collector 100. The wheels 154 are rotationally coupled to the lift support frame 152. The lifting mechanism 150 is moveable between a first position (also referred to herein as "engaged position") that raises the roller assembly 120 above a collection surface and a second position (also referred to herein as "non-engaged position") where the roller assembly 120 contacts the collection surface. In the engaged position, the roller assembly 120 is suspended above the collection surface by the wheels 154. FIG. 1 illustrates the rolling collector 100 with the lifting mechanism 150 in the engaged position (i.e., lift handle 158 positioned forward). In the engaged position, the rolling collector 100 is supported by the wheels 154, and the roller assembly 120 is not operational. In the non-engaged position, the roller assembly 120 is in contact with the collection surface. FIG. 2 illustrates the rolling collector 100 with the lifting mechanism 150 in the non-engaged position (i.e., lift handle 158 positioned rearward). In the non-engaged position, the rolling collector 100 is supported by the roller assembly 120, and the roller assembly 120 is operational. The lifting mechanism 150 is sized and shaped to hold the lift support frame 152 in the engaged position or the non-engaged position. In other words, the lifting mechanism 150 does not require a lock, safety pin, etc. to hold the lift support frame 152 in the engaged position or the non-engaged position. Optionally, as shown in FIGS. 1, 3, and 5, a lift catch mechanism 118 can be provided on collector frame 110. The lift catch mechanism 118 assists in maintaining the lifting mechanism (e.g., lifting mechanism 150 shown in FIG. 2) in the non-engaged position. For example, the lift catch mechanism 118 is sized and shaped to provide a mechanical stop. It should be understood that lift catch mechanisms 118 can be provided on either or both sides of the collector frame 110. It should also be understood that the size, shape, and/or arrangement of the lift catch mechanism 118 shown in FIGS. 1, 3, and 5 are provided only as an example.

Referring again to FIGS. 1-4, the collector frame 110 includes a lower basket seat portion 170 arranged forwardly with respect to the roller assembly 120. Optionally, the lower basket seat portion 170 is formed by one or more of the first side 110a, the second side 110b, and cross members 110c and 110d. The lower basket seat portion 170 is configured to accommodate one or more collection baskets 165. As discussed above, when a small item (e.g., nut, bullet casing, etc.) jammed between adjacent flexible tines encounters the remover mechanism 130, the small item is pried from the grip of the flexible tines as the rolling assembly 120 rotates, and the small item then slides across remover mechanism 130 and into a collection basket 165. Optionally, in some implementations, the collection baskets 165 are of common size, e.g., 8 inch by 16 inch by 24 inch baskets or 8 inch by 16 inch by 12 inch baskets. In FIGS. 1-4, the lower basket seat portion 170 is designed and configured to accommodate two baskets arranged side-by-side. This disclosure contemplates that the lower basket seat portion 170 can be designed and configured to accommodate a different number of collection baskets and/or collection baskets of various sizes.

Optionally, in some implementations, the collector frame 110 includes an upper basket seat portion 160 arranged above the roller assembly 120. The upper basket seat portion 160 is configured to accommodate one or more collection baskets 165. This disclosure contemplates that excess collection baskets 165 (e.g. full or empty baskets) can be stacked on the upper basket seat portion 160, and that collection baskets 165 can be moved between the lower basket seat portion 170 and the upper basket seat portion 160 as needed during operation of the rolling collector 100. Optionally, the upper basket seat portion 160 includes one or more tie down anchors 162, 164. It should be understood that the one or more tie down anchors 162, 164 can be used to secure collection baskets 165 to the upper basket seat portion 160, for example, using string, rope, bungee cords, straps, etc. It should also be understood that the size, shape, number and/or arrangement of tie down anchors 162, 164 shown in the figures are provided only as examples. This disclosure contemplates providing a different size, shape, number and/or arrangement of tie down anchors 162, 164.

Referring now to FIG. 3, the upper basket seat portion 160 includes a first basket seat side 160a and a second basket seat side 160b spaced laterally apart and interconnected by at least one basket seat cross member 160c and 160d. The basket seat cross member (or cross members) can be attached perpendicularly between the first and second basket seat sides 160a and 160b. As shown in FIG. 3, the first basket seat side 160a and the second basket seat side 160b are connected at opposite ends of the basket seat cross members 160c and 160d. The first and second basket seat sides 160a and 160b can be connected to the basket seat cross members 160c and 160d by one or more fasteners such as welded joints, screws, nuts and bolts, rivets, or other fastening mechanism. It should be understood that the number and/or arrangement of basket seat cross members 160c and 160d in FIG. 3 are provided only as an example. This disclosure contemplates providing different numbers and/or arrangements of basket seat cross members.

Additionally, the first and second basket seat sides 160a and 160b and basket seat cross members 160c and 160d are formed from a rigid material. For example, in some implementations, the first and second basket seat sides 160a and 160b and basket seat cross members 160c and 160d are metal. Optionally, the first and second basket seat sides 160a and 160b and basket seat cross members 160c and 160d are flat metal such as sheet metal or flat plate metal. It should be understood that metal is provided only as an example material. This disclosure contemplates that the first and second basket seat sides 160a and 160b and basket seat cross members 160c and 160d can be formed from other suitable rigid material including, but not limited to, wood, plastic, fiberglass, or composite material. Additionally, each of the first and second basket seat sides 160a and 160b includes a plurality of components (see FIG. 3) or alternatively can be a single component (not shown). When a side includes a plurality of components, the components can be connected by one or more fasteners such as welded joints, screws, nuts and bolts, rivets, or other fastening mechanism. Optionally, in some implementations, the first and second basket seat sides 160a and 160b and basket seat cross members 160c and 160d includes one or more holes, notches, grooves, etc. to facilitate assembly of the rolling collector 100.

Figure 7:
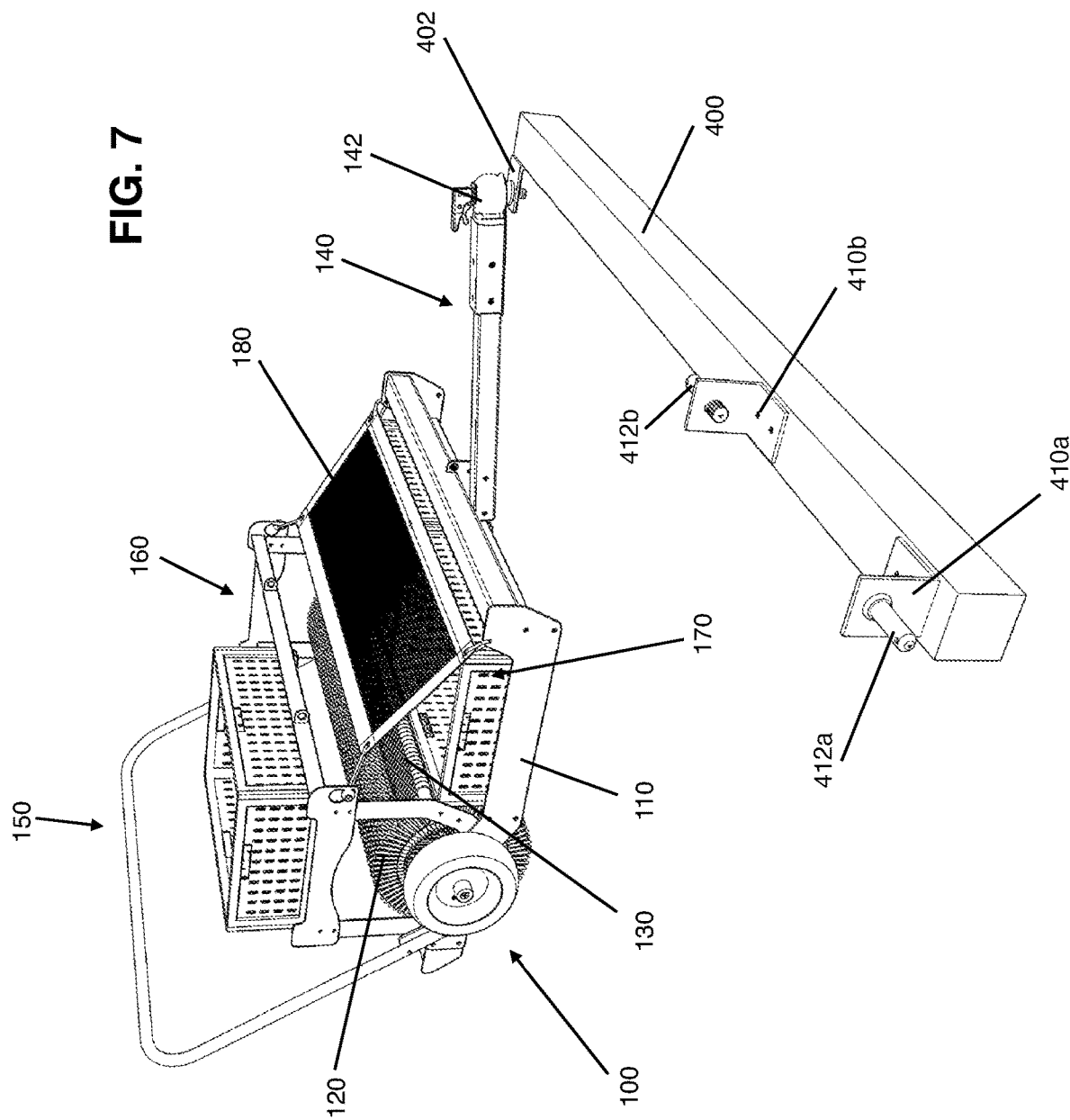
FIG. 7 is a perspective view illustrating another towable rolling collector configured for side-by-side operation according to implementations described herein.

Optionally, in some implementations, the rolling collector 100 further includes a baffle mechanism 180, which is shown in FIG. 7. The baffle mechanism 180 is configured to deflect objects into a collection basket. As discussed above, when a small item (e.g., nut, bullet casing, etc.) jammed between adjacent flexible tines encounters the remover mechanism 130, the small item is pried from the grip of the flexible tines as the rolling assembly 120 rotates, and the small item then slides across remover mechanism 130 and into a collection basket. The baffle mechanism 180 is configured to deflect errant small items into a collection basket. With the baffle member 180 installed, the rolling collector can be towed at higher speeds without loss of product. This disclosure contemplates that the baffle mechanism 180 is made of any suitable material for deflecting the small items to be collected by the rolling collector 100. As shown in FIG. 7, the baffle mechanism 180 can be coupled between the first and second sides of the rolling collector 100. The baffle member is arranged forward with respect to the roller assembly 120 and above the lower basket seat portion 170. Additionally, the baffle mechanism 180 can be configured for quick installation/removal in order to provide access to the collection baskets.

Figure 6:
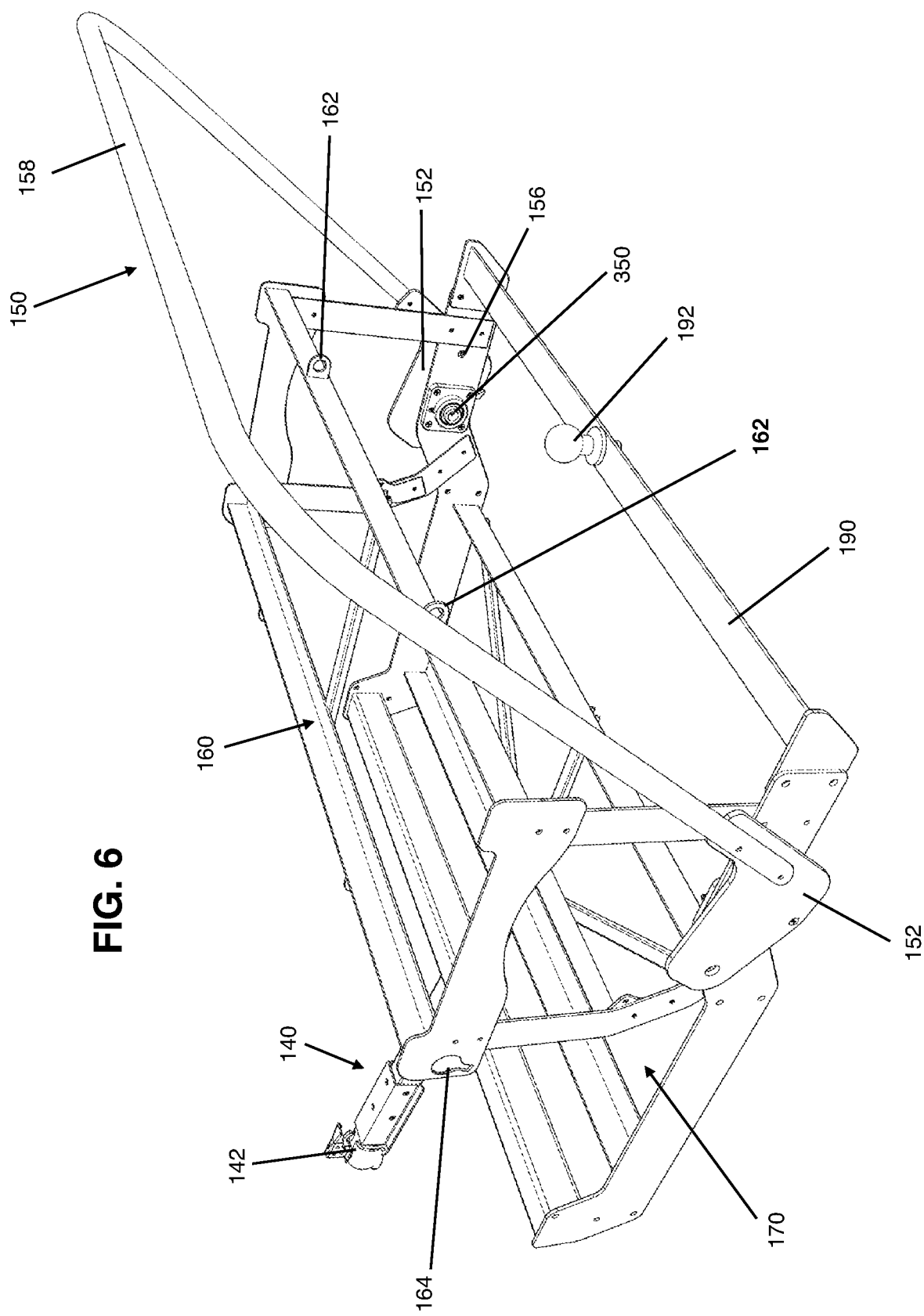
FIG. 6 is a perspective view illustrating a towable rolling collector according to implementations described herein.

Optionally, in some implementations, the collector frame 110 includes a rear bumper member 190, which is shown in FIG. 6. The rear bumper member 190 is formed from a rigid material. For example, in some implementations, the rear bumper member 190 is metal. Optionally, the rear bumper member 190 is a metal bar or tubing such as flat bar, round bar, angle bar, or metal tubing (e.g., round, square, rectangular). For example, in FIG. 6, the rear bumper member 190 is metal tubing. It should be understood that metal is provided only as an example material. This disclosure contemplates that the rear bumper member 190 can be formed from other suitable rigid material including, but not limited to, wood, plastic, fiberglass, or composite material. Additionally, the rear bumper member 190 can be coupled to the collector frame 110 by one or more fasteners such as welded joints, screws, nuts and bolts, rivets, or other fastening mechanism. As shown in FIG. 6, the rear bumper member 190 can be attached between the first and second sides of the rolling collector 100.

The rear bumper member 190 optionally has a rear hitch mount 192, e.g., a ball mount, lunette ring, or other type of hitch mount. This facilitates additional rolling collector(s) to be towed one behind another, optionally where each rolling collector has a roller assembly configured to pick up different-sized small items (e.g., nuts, bullet casings, etc.). Such a towing configuration allows the user to collect a plurality of different-sized small items per pass, which is particularly useful for certain types of nut harvesting applications (e.g., chestnut harvesting). This arrangement allows the user to broaden collection coverage per pass by towing multiple rolling collectors at the same time. Optionally, the rear bumper member 190 includes one or more tie down anchors for securing string, rope, bungee cords, straps, etc.

Optionally, in some implementations, the rolling collector 100 optionally further includes a push handle coupled to the collector frame 110, the push handle extending upwards from the collector frame 110. The push handle can be used by the user for manual operation, for example, to reposition the rolling collector 100 for storage and/or during hitching operations.

Figure 8:
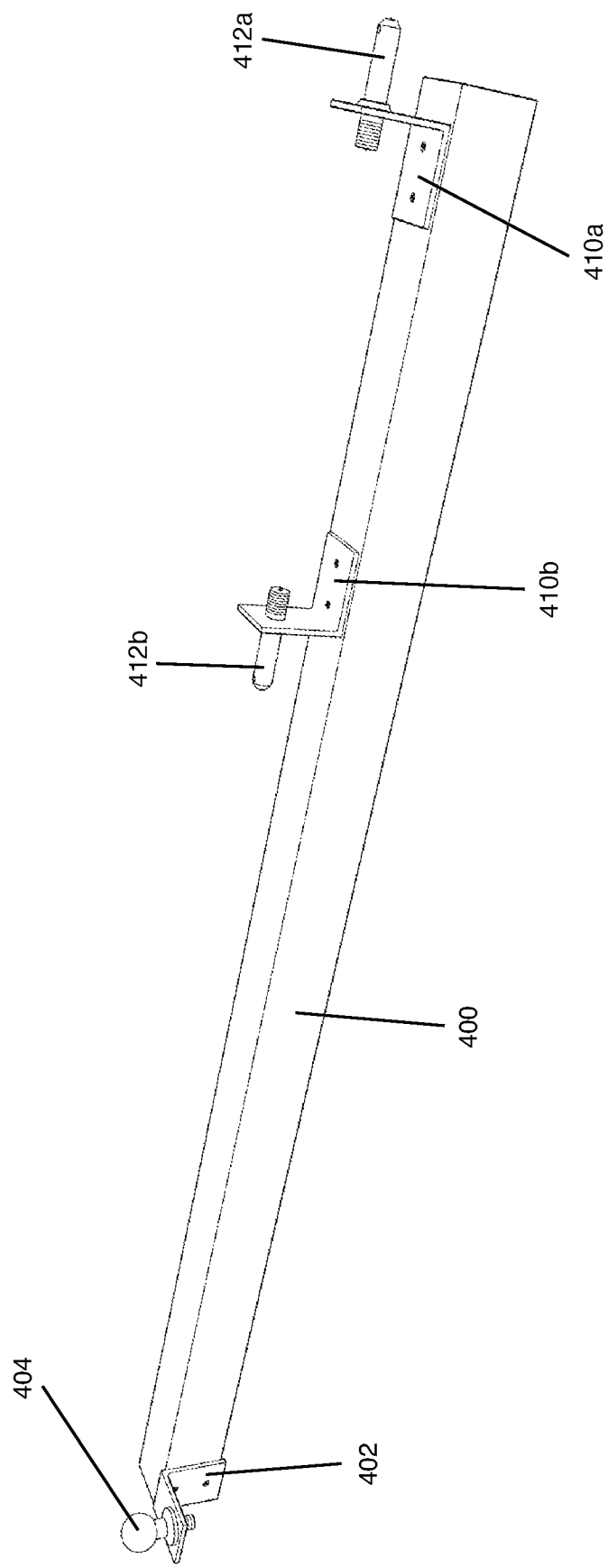
FIG. 8 illustrates a post member of the towable rolling collector of FIG. 7.
Figure 9:
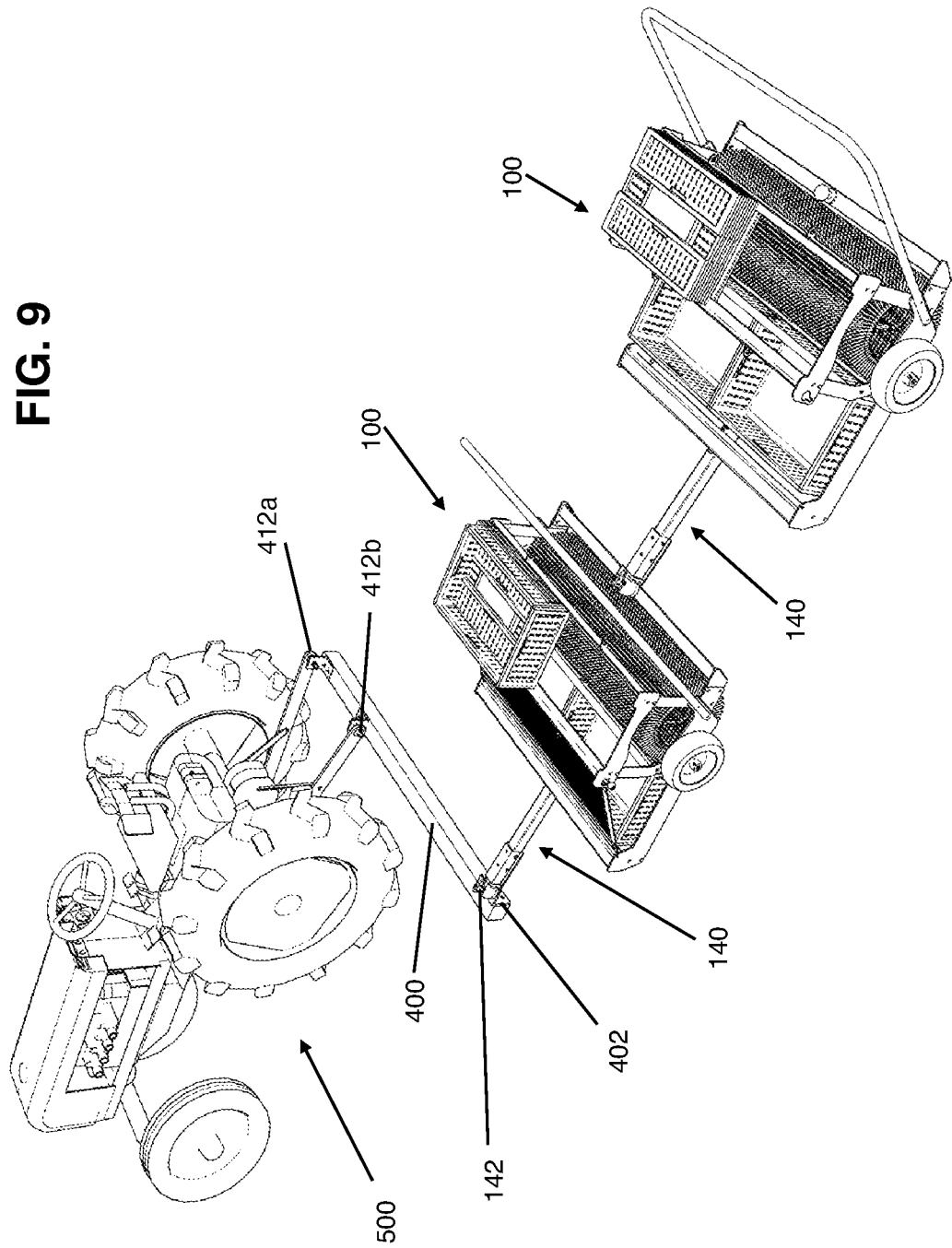
FIG. 9 is a perspective view illustrating a tractor towing a plurality of towable rolling collectors according to implementations described herein.
Figure 12:
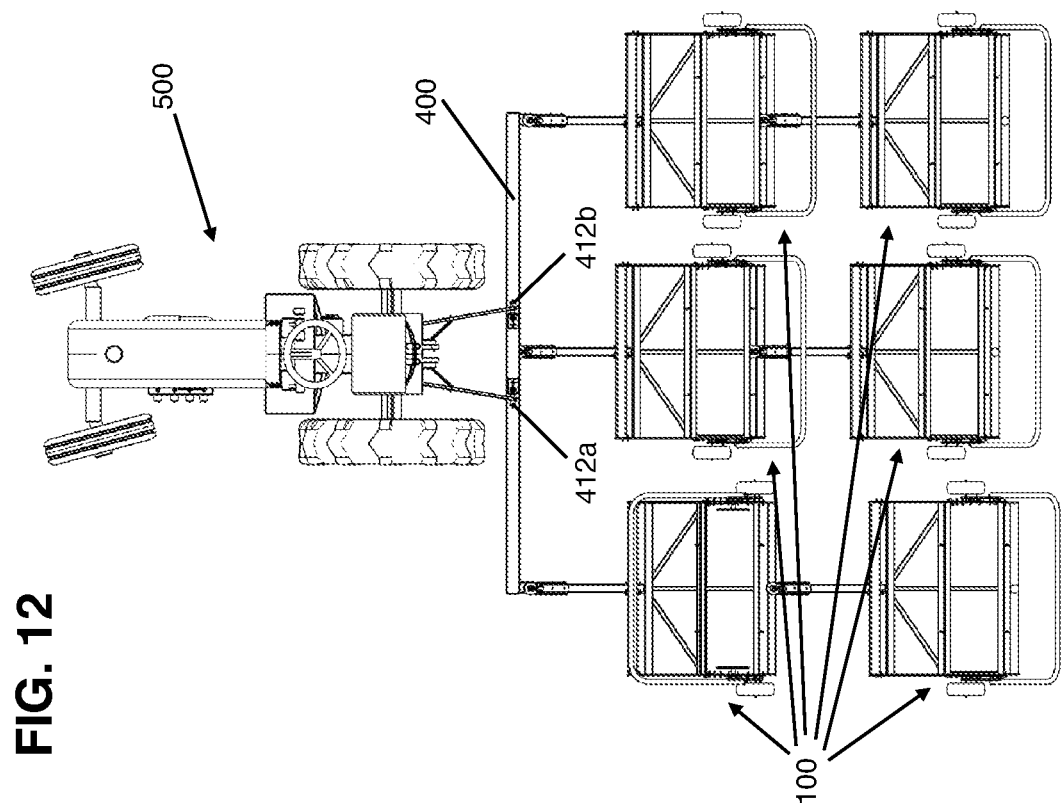
FIG. 12 is a top view illustrating a tractor towing a plurality of towable rolling collectors in a side-by-side configuration according to implementations described herein.

Referring now to FIG. 7, a towable rolling collector configured for side-by-side operation is shown (see e.g., FIGS. 9 and 12). The rolling collector 100 shown in FIG. 7 includes many of the same features of the rolling collector 100 shown in FIGS. 1-3 and 6 and these features are not described in further detail below. The rolling collector 100 in FIG. 7 further includes a post member 400. The post member 400 is also shown in FIG. 8. Optionally, in some implementations, the post member 400 is a piece of lumber such as a 4 inch by 4 inch (4×4) post, for example. Although lumber is provided as an example material, this disclosure contemplates that the post member 400 can be formed of other suitable materials including, but not limited to, metal. A hitch mount 404 is provided at a first end of the post member 400. The hitch mount 404 is coupled to the post member 400 via a first bracket 402. The first bracket 402 is attached to the post member 400 by one or more fasteners such as welded joints, screws, nuts and bolts, rivets, or other fastening mechanism. A pair of draw pins 412a and 412b are provided at a second end of the post member 400. The second end is spaced apart from and opposite to the first end. The pair of draw pins 412a and 412b are coupled to the post member 400 via a pair of brackets 410a and 410b. The pair of brackets 410a and 410b are attached to the post member 400 by one or more fasteners such as welded joints, screws, nuts and bolts, rivets, or other fastening mechanism. It should be understood that the number and/or arrangement of the hitch mounts and draw pins shown in FIGS. 7 and 8 are provided only as examples. For example, a post member can optionally include more or less hitch mounts than shown in FIGS. 7 and 8. In one non-limiting example, draw pins can be provided centrally on the post member with hitch mounts provided at opposite ends.

The pair of draw pins 412a and 412b are mounted at an appropriate distance (and spacing between) to facilitate connection to a lift arm of a tractor, which is the tow vehicle. In this way, the post member 400 extends laterally from the rear of the tractor to the rolling collector 100, which is pulled along behind and to the rear of the tractor but offset to one side of the tractor. Optionally, a plurality of post members 400 can be provided, e.g., one for each lift arm (left and right) of the tractor. Additionally, it should be understood that the tractor can tow an additional rolling collector in a center pull configuration. In other words, the tractor can be configured to tow multiple rolling collectors 100 (e.g., 2 or 3) in a side-by-side configuration. This allows the user to broaden collection coverage per pass by towing multiple rolling collectors at the same time.

Referring now to FIGS. 9-12, example tow vehicle configurations are described. This disclosure contemplates that a tow vehicle can be a tractor, truck, golf cart, utility vehicle, or other motorized vehicle. Additionally, it should be understood that the configurations shown in FIGS. 9-12 are provided only as examples and that other towing configurations are possible according to this disclosure.

FIG. 9 illustrates a tractor 500 towing a plurality of rolling collectors 100. In FIG. 9, the forward rolling collector 100 is in a side-by-side configuration (see e.g., FIG. 7) and the rear rolling collector 100 is in a center pull configuration (see e.g., FIG. 1). In particular, the post member 400 is coupled to the lift arm of the tractor 500 via the pair of draw pins 412a and 412b. In this way, the post member 400 extends laterally from the rear of the tractor 500 to the rolling collectors 100, which are pulled along behind and to the rear of the tractor 500 but offset to one side of the tractor 500. In this configuration, the rolling collectors 100 can be maneuvered to pick up small objects such as nuts without being crushed by the wheels of the tractor 500. As shown in FIG. 9, the hitch coupler 142 of the trailer tongue 140 of the forward rolling collector 100 is coupled to a hitch mount of the post member 400 (which is coupled via the first bracket 402), and the hitch coupler of the trailer tongue 140 of the rear rolling collector 100 is coupled to a rear hitch mount provided on the rear bumper member of the forward rolling collector 100. It should be understood that the number of rolling collectors shown in FIG. 9 (i.e., two rolling collectors) are provided only as an example. This disclosure contemplates a towing configuration with more than two rolling collectors 100.

FIG. 10 illustrates a lawn mower 502 towing a rolling collector 200 for side pull operations. The rolling collector 200 includes the trailer tongue 240, which is coupled to the side dragger extension frame 202 and extends forwardly from the rolling collector 200. In this configuration, the rolling collector 200 can be maneuvered to pick up small objects such as nuts without being crushed by the wheels of the lawn mower 502. As shown in FIG. 10, the hitch coupler 242 of the trailer tongue 240 is coupled to a hitch mount on the lawn mower 502. It should be understood that the number of rolling collectors shown in FIG. 10 (i.e., one rolling collector) is provided only as an example. This disclosure contemplates a towing configuration with more than one rolling collector 200.

FIG. 11A illustrates a lawn mower 502 towing a plurality of rolling collectors 100, 200. In FIG. 11A, the forward rolling collector 200 is in a side pull configuration (see e.g., FIG. 5) and the rear rolling collector 100 is in a center pull configuration (see e.g., FIG. 1). In particular, rolling collector 200 is configured for side pull operations and includes a trailer tongue, which is coupled to the side dragger extension frame 202 and extends forwardly from the rolling collector 200. The hitch coupler 242 of the trailer tongue 240 is coupled to a hitch mount on the lawn mower 502. Additionally, the hitch coupler of the trailer tongue 140 of the rolling collector 100 is coupled to a rear hitch mount provided on the rear bumper member of the rolling collector 200. In this configuration, the rolling collectors 100, 200 can be maneuvered to pick up small objects such as nuts without being crushed by the wheels of the lawn mower 502. It should be understood that the number of rolling collectors shown in FIG. 11A (i.e., two rolling collectors) are provided only as an example. This disclosure contemplates a towing configuration with more than two rolling collectors.

FIG. 11B illustrates a lawn mower 502 towing a plurality of rolling collectors 100 for center pull operations. In FIG. 11B, both rolling collectors 100 are in a center pull configuration (see e.g., FIG. 1). As shown in FIG. 11B, the hitch coupler of the trailer tongue 140 of a forward rolling collector 100 is coupled to a hitch mount of the lawn mower 502, and the hitch coupler of the trailer tongue 140 of a rearward rolling collector 100 is coupled to a rear hitch mount provided on the rear bumper member of the forward rolling collector 100. It should be understood that the number of rolling collectors shown in FIG. 11B (i.e., two rolling collectors) are provided only as an example. This disclosure contemplates a towing configuration with more than two rolling collectors.

FIG. 12 illustrates a tractor 500 towing a plurality of rolling collectors 100. In FIG. 12, the rolling collectors 100 are arranged in two rows and three columns behind the tractor 500. It should be understood that the number of rolling collectors shown in FIG. 12 (i.e., six rolling collectors) are provided only as an example. This disclosure contemplates a towing configuration with more or less than six rolling collectors. In FIG. 12, the post member 400 is coupled to the lift arm of the tractor 500 via the pair of draw pins 412a and 412b. In this way, the post member 400 extends laterally from the rear of the tractor 500 in both directions. Hitch mounts (i.e., left, right, and center) are provided on the post member such that the rolling collectors 100 are pulled along behind and to the rear of the tractor 500. One column of rolling collectors 100 is offset to the left side of the tractor 500. One column of rolling collectors 100 is offset to the right side of the tractor 500. One column of rolling collectors 100 is located centrally with respect to the tractor 500. In other words, the rolling collectors 100 are arranged in a side-by-side configuration.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A rolling collector, comprising:
   a collector frame comprising a first side, a second side, and at least one cross member, wherein the first side and the second side are spaced apart and coupled to opposite ends of the at least one cross member;
   a roller assembly comprising a skeleton structure and a plurality of tine wheel units, each of the tine wheel units comprising a plurality of flexible tines, and the skeleton structure comprising a pair of hubs and a plurality of struts, wherein a first hub and a second hub of the pair of hubs are coupled to respective opposite ends of each of the struts, wherein the tine wheel units are arranged around and supported by the struts, and wherein the skeleton structure is rotationally coupled between the first side and the second side;
   a remover mechanism arranged between the first side and the second side, wherein the remover mechanism comprises a plurality of teeth, each of the teeth extending respectively between two adjacent tine wheel units; and
   a lifting mechanism comprising a plurality of wheels, a lift support frame, and a lift handle coupled to the lift support frame, wherein the lifting mechanism is rotationally coupled to the collector frame, wherein the lift handle is configured for manual operation by a user to move the lift support frame between an engaged position and a non-engaged position, and wherein the wheels are configured to raise the roller assembly above a collection surface in the engaged position.

2. The rolling collector of claim 1, wherein each of the first hub and the second hub of the pair of hubs comprises a respective stub shaft, and wherein the respective stub shafts are supported by the first side and the second side.

3. The rolling collector of claim 2, further comprising a pair of bearing assemblies, wherein a first bearing assembly and a second bearing assembly of the pair of bearing assemblies are coupled to the first side and the second side, respectively, and wherein the respective stub shafts are installed within and supported by the pair of bearing assemblies.

4. The rolling collector of claim 1, further comprising a pair of bearing assemblies, wherein a first bearing assembly and a second bearing assembly of the pair of bearing assemblies are coupled to the first hub and the second hub of the pair of hubs, respectively, wherein each of the first side and the second side comprises a respective stub shaft, and wherein the respective stub shafts are installed within and supported by the pair of bearing assemblies.

5. The rolling collector of claim 1, further comprising a trailer tongue coupled to the collector frame, wherein the trailer tongue comprises a hitch coupler.

6. The rolling collector of claim 5, wherein the trailer tongue is coupled to the collector frame via a tongue height adjustment plate.

7. The rolling collector of claim 1, further comprising:
   a side dragger extension frame coupled to the collector frame, wherein the side dragger extension frame is arranged outboard with respect to one of the first side or the second side; and
   a trailer tongue coupled to the side dragger extension frame, wherein the trailer tongue comprises a hitch coupler.

8. The rolling collector of claim 1, wherein the collector frame comprises an upper basket seat portion arranged above the roller assembly, and wherein the upper basket seat portion is configured to accommodate one or more collection baskets.

9. The rolling collector of claim 1, wherein the collector frame comprises a lower basket seat portion arranged forwardly with respect to the roller assembly, and wherein the lower basket seat portion is configured to accommodate one or more collection baskets.

10. The rolling collector of claim 1, further comprising a baffle mechanism coupled between the first side and the second side, wherein the baffle mechanism is configured to deflect objects into a collection basket.

11. The rolling collector of claim 1, wherein the collector frame comprises a rear bumper member coupled between the first side and the second side, the rear bumper member comprising a rear hitch mount.

12. The rolling collector of claim 1, wherein the lift support frame is movable around a respective rotational mounting point located at each of the first side and the second side.

13. The rolling collector of claim 1, wherein the lifting mechanism is sized and shaped to hold the lift support frame in the engaged position or the non-engaged position.

14. The rolling collector of claim 1, wherein the remover mechanism further comprises a remover cross member coupled to the collector frame, wherein the teeth are pivotably connected to the remover cross member.

15. The rolling collector of claim 1, further comprising a push handle coupled to the collector frame, the push handle extending upwards from the collector frame.

16. A rolling collector, comprising:
   a collector frame comprising a first side, a second side, and at least one cross member, wherein the first side and the second side are spaced apart and coupled to opposite ends of the at least one cross member;
   a roller assembly comprising a plurality of tine wheel units, each of the tine wheel units comprising a plurality of flexible tines, wherein the roller assembly is rotationally coupled between the first side and the second side;
   a remover mechanism arranged between the first side and the second side, wherein the remover mechanism comprises a plurality of teeth, each of the teeth extending respectively between two adjacent tine wheel units; and
   a lifting mechanism comprising a plurality of wheels, a lift support frame, and a lift handle coupled to the lift support frame, wherein the lifting mechanism is rotationally coupled to the collector frame, wherein the lift handle is configured for manual operation by a user to move the lift support frame between an engaged position and a non-engaged position, and wherein the wheels are configured to raise the roller assembly above a collection surface in the engaged position.

17. The rolling collector of claim 16, further comprising a trailer tongue coupled to the collector frame, wherein the trailer tongue comprises a hitch coupler.

18. The rolling collector of claim 16, further comprising:
   a side dragger extension frame coupled to the collector frame, wherein the side dragger extension frame is arranged outboard with respect to one of the first side or the second side; and
   a trailer tongue coupled to the side dragger extension frame, wherein the trailer tongue comprises a hitch coupler.

19. The rolling collector of claim 16, wherein the collector frame comprises an upper basket seat portion arranged above the roller assembly, the upper basket seat portion being configured to accommodate one or more collection baskets, or wherein the collector frame comprises a lower basket seat portion arranged forwardly with respect to the roller assembly, the lower basket seat portion being configured to accommodate one or more collection baskets.

20. The rolling collector of claim 16, wherein the lift support frame is movable around a respective rotational mounting point located at each of the first side and the second side.

21. The rolling collector of claim 16, wherein the lifting mechanism is sized and shaped to hold the lift support frame in the engaged position or the non-engaged position.

* * * * *